(12) United States Patent
Burugula et al.

(10) Patent No.: US 7,437,529 B2
(45) Date of Patent: Oct. 14, 2008

(54) METHOD AND MECHANISM FOR EFFICIENTLY CREATING LARGE VIRTUAL MEMORY PAGES IN A MULTIPLE PAGE SIZE ENVIRONMENT

(75) Inventors: Ramanjaneya Sarma Burugula, Peekskill, NY (US); David Alan Hepkin, Austin, TX (US); Joefon Jann, Ossining, NY (US); Thomas Stanley Mathews, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/154,159

(22) Filed: Jun. 16, 2005

(65) Prior Publication Data

US 2006/0288187 A1  Dec. 21, 2006

(51) Int. Cl.
- G06F 12/00 (2006.01)
- G06F 13/00 (2006.01)
- G06F 13/28 (2006.01)
- G06F 9/26 (2006.01)
- G06F 9/34 (2006.01)

(52) U.S. Cl. .................. 711/171; 711/170; 711/173; 711/203; 711/206

(58) Field of Classification Search .................. 711/171
See application file for complete search history.

(56) References Cited

U.S. PATENT DOCUMENTS

| | | | |
|---|---|---|---|
| 5,706,461 A | 1/1998 | Branstad et al. | |
| 5,765,201 A | 6/1998 | Manges et al. | |
| 6,182,089 B1 * | 1/2001 | Ganapathy et al. | 707/206 |
| 6,233,666 B1 | 5/2001 | Mathews et al. | |
| 6,754,788 B2 | 6/2004 | Mathews et al. | |
| 6,823,440 B2 | 11/2004 | Fleming et al. | |
| 6,922,765 B2 * | 7/2005 | Jacobs | 711/173 |
| 2004/0064601 A1 * | 4/2004 | Swanberg | 710/22 |
| 2004/0064671 A1 | 4/2004 | Manoj | |
| 2004/0064676 A1 | 4/2004 | Burugula et al. | |
| 2005/0108496 A1 * | 5/2005 | Elnozahy et al. | 711/203 |
| 2006/0179177 A1 * | 8/2006 | Arndt et al. | 710/22 |

OTHER PUBLICATIONS

Kriz, Variable Block Paging for Virtual Memory, Data Base: TDBS, TDB 09-84, p. 2296-2298, Poughkeepsie, NY.
Miller, Memory Proportioned Pages, Data base: TDBS, TDB 07-73 p. 562-563, Rochester, MN.
David A. Hepkin, U.S. Appl. No. 10/920,907, filed Aug. 18, 2004, entitled, Pretranslating Input/Output Buffers in Environments with Multiple Page Sizes.

* cited by examiner

*Primary Examiner*—Kevin Ellis
*Assistant Examiner*—Ryan Bertram
(74) *Attorney, Agent, or Firm*—Dillon & Yudell LLP

(57) ABSTRACT

A method and system for efficiently migrating in-use small pages to enable promotion of contiguous small pages into large pages in a memory environment that includes small pages pinned to real memory and/or and small pages mapped to direct memory access (DMA) within real memory. The operating system is designed with a two-phase page promotion engine/utility that enables coalescing contiguous small virtual memory pages to create large virtual memory pages by migrating in-use small memory pages including those that are pinned and/or mapped to DMA.

5 Claims, 4 Drawing Sheets

METHOD AND MECHANISM FOR EFFICIENTLY CREATING LARGE VIRTUAL MEMORY PAGES IN A MULTIPLE PAGE SIZE ENVIRONMENT

BACKGROUND OF THE INVENTION

1. Technical Field

The present invention relates generally to computer systems and in particular to memory functions within a computer system. Still more particularly, the present invention relates to a method and system for creating large virtual memory pages from smaller pages in a computer system.

2. Description of the Related Art

Almost all modern operating systems utilize a page-based virtual memory architecture where virtual memory is mapped to real memory in units of pages. The amount of available memory is finite, and the memory is subdivided into multiple individual pages of a pre-established size. To improve system performance, many computer architectures and operating systems have begun adding support for multiple page sizes within a single system.

On systems that support multiple page sizes, an operating system may need to change the distribution of real memory across page sizes to satisfy the demands of a particular workload. In order to create more pages of a particular page size, an operating system must find free (unused) pages of other sizes and convert them into pages of the needed size. For example, on a system with two page sizes of 4K and 64K, respectively, the current workload on the operating system may have more demand for 4K pages than 64K pages. The operating system may thus need to increase the number of 4K pages, and can only do so by decreasing the number of 64K pages (i.e., breaking up one or more of the 64K pages into 4K pages).

When an operating system needs to increase the number of small pages, the operating system can break up a free larger sized page into multiple smaller sized pages (via a process referred to in the art as page demotion). For example, an operating system can break up a free 64K page by simply treating it as 16-4K pages. Thus, increasing the number of smaller sized pages is fairly simple.

However, creating large pages from small pages (a process referred to in the art as page promotion) is much more difficult and presents a significant challenge due to fragmentation. For example, in order to create a 64K page from 4K pages, an operating system must find 16 free 4K pages that are contiguous in real memory and then combine them into a 64K page. On a heavily utilized system, finding sufficient contiguous free small pages to create a large page is often difficult, if not impossible.

To handle fragmentation of small virtual memory pages on a heavily utilized system, an operating system will often use page migration to move small pages around in real memory in order to create a contiguous range of free small pages. For example, if an operating system is trying to free-up 16 contiguous 4K pages to create a 64K page, the operating system could migrate each in-use 4K page in the target range to another location in real memory. Thus, the operating system moves out all of the in-use 4K pages in a contiguous range of real memory, and then the operating system utilizes that contiguous range of real memory as a large page.

While using conventional page migration to free up contiguous ranges of small pages is fairly efficient, the process is often hindered by the presence, within the memory, of pages that are locked (i.e. pinned) and thus not able to be migrated. In addition to the limitations imposed by the occurrence of locked pages, other pages mapped for direct memory access (DMA) cannot be migrated. The conventional page migration engine allows the operating system to efficiently move small pages to different real memory locations. However, a conventional page migration engine cannot handle pinned pages or DMA-mapped pages.

Thus, if a system has many pinned pages and/or many pages mapped for DMA scattered throughout real memory, a conventional page migration engine will be ineffective in migrating these in-use pages to free up enough contiguous small pages for promotion to a larger page. That is, the operating system will not be able to provide enough contiguous small pages to combine into a large virtual memory page. With this restriction, the operating system's ability to dynamically change the distribution of real memory across a system's page sizes is substantially limited. Workload requiring larger pages may encounter serious performance degradation because the operating system is unable to create enough pages of the size needed by the workload.

The present invention recognizes that a method is required to enable dynamic migration of sufficient in-use small pages to generate large pages required for a workload regardless of whether the pages are pinned or mapped to DMA. This and other benefits are provided by the invention described herein.

SUMMARY OF THE INVENTION

Disclosed is a method and system for efficiently migrating in-use small pages to enable promotion of contiguous small pages into large pages in a memory environment that includes small pages pinned to real memory and/or and small pages mapped to direct memory access (DMA) within real memory. The operating system is designed with a two-phase page promotion engine/utility that enables coalescing contiguous small virtual memory pages to create large virtual memory pages by migrating in-use small memory pages including those that are pinned and/or mapped to DMA.

The first-phase page promotion engine is referred to herein as "lightweight" page promotion. The operating system triggers/activates the lightweight page promotion engine when the operating system determines that the current workload requires an increase in the number of large virtual memory pages available. In the lightweight page promotion phase, the operating system utilizes a conventional page migration engine to move unpinned small pages to different locations in real memory. The operating system has a target of large pages it needs to create and attempts to free up enough contiguous small pages to provide the target of large pages. When the operating system recognizes that it is unable to create the target number of large pages using the standard page migration engine, the operating system activates the second-phase page promotion engine.

The second-phase page promotion engine provides page promotion of pinned small pages and promotion of pages mapped to DMA, both referred to herein as "heavyweight" page promotion. In the heavyweight page promotion phase, the operating system utilizes its dynamic memory removal engine to free up contiguous ranges of small pages. Conventionally, the operating system's dynamic memory removal engine is used to remove real memory from a running operating system instance for use by another operating system instance (i.e., for use with dynamic logical partitioning). According to illustrative embodiments of the present invention, the functionality of the dynamic memory removal engine is adapted/enhanced to provide migration of pinned and DMA-mapped pages and thus free up ranges of contiguous small pages that can then be combined into large pages.

For each range of contiguous small pages needed to be freed, the heavyweight page promotion engine executes a dynamic memory removal event, which causes the dynamic memory removal engine to free each range of contiguous small pages using the entire dynamic memory removal infrastructure. In operating systems such as AIX, for example, the dynamic memory removal engine handles migrating pinned and DMA-mapped pages by communicating with the operating system's DMA subsystem. In one embodiment, the dynamic memory removal engine can also handle migrating pages that are pre-translated for DMA. Once a dynamic memory remove operation has completed for a contiguous range of small pages, all of the small pages in the range will no longer be in-use, and the heavy-weight page promotion engine can combine the contiguous small pages into a larger sized page.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN
ILLUSTRATIVE EMBODIMENT

The present invention provides a method and system for efficiently migrating in-use small pages to enable promotion of contiguous small pages into large pages in a memory environment that includes small pages pinned to real memory and/or and small pages mapped to direct memory access (DMA) within real memory. The operating system is designed with a two-phase page promotion engine/utility that enables coalescing contiguous small virtual memory pages to create large virtual memory pages by migrating in-use small memory pages including those that are pinned and/or mapped to DMA. The first-phase page promotion engine is referred to herein as "lightweight" page promotion. The second-phase page promotion engine provides page promotion of pinned small pages and promotion of pages mapped to DMA, both referred to herein as "heavyweight" page promotion.

Figure 1:
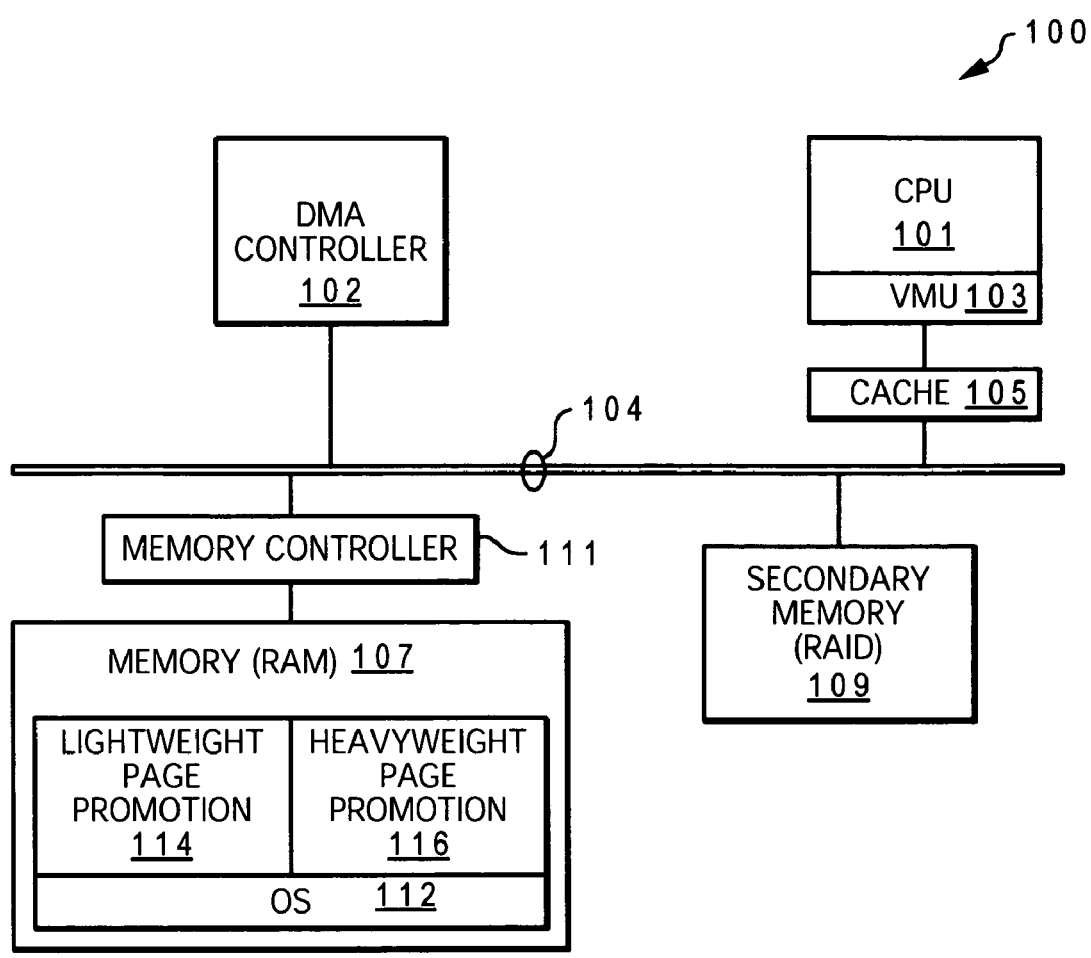
FIG. 1 is a block diagram illustrating hardware/software components of an exemplary data processing system within which exemplary embodiments of the invention may advantageously be implemented.

Referring now to the figures and in particular to FIG. 1 which provides a block diagram representation of an exemplary computer system within which the features of the invention may advantageously be implemented. Computer system 100 comprises a central processing unit (CPU) 101, fabricated on the same chip as a virtual memory unit 103. CPU 101 includes a virtual memory unit (VMU) 103 and is coupled to memory 107 (or memory controller 111) and secondary memory 109 via system bus 104. Also connected to system bus is DMA controller 102, which controls allocation of memory spaces via direct memory access and memory controller 111, which controls standard memory allocation (to memory 107 and/or secondary memory 109) and other memory access operations. Coupled between CPU and system bus 104 is cache 105 which provides temporary storage of instructions/data being utilized by CPU 101.

Illustrated within memory 107 are software components, namely, operating system 112 and two software utilities that provide several of the functional features of the present invention. These utilities are referred to herein as lightweight page promotion (or migration) engine/utility 114 and heavyweight page promotion (or migration) engine/utility 116. These two engines support the page promotion of smaller pages to larger pages in a two-step (or two-phase) process, described in details below. For simplicity, the invention is described with reference to both utilities as lightweight page promotion engine 114 and heavyweight page promotion engine 116, although it is understood that a key function of both utilities involves page migration.

While the invention is described with specific reference to the above described computer system 100 including specific hardware and software components thereof, it is understood that the invention applies to many different types and different configurations of computer systems. The above description is provided for example and is not meant to impose any limitations on the scope of the invention. Also, while the invention is described below from the perspective of combining small 4K pages into larger 64K pages, the features of the invention apply to any sized small and/or large pages that may e supported by the particular computer system. Thus, for example, the invention would apply to a process for coalescing 16K pages into 128K pages.

Figure 2:
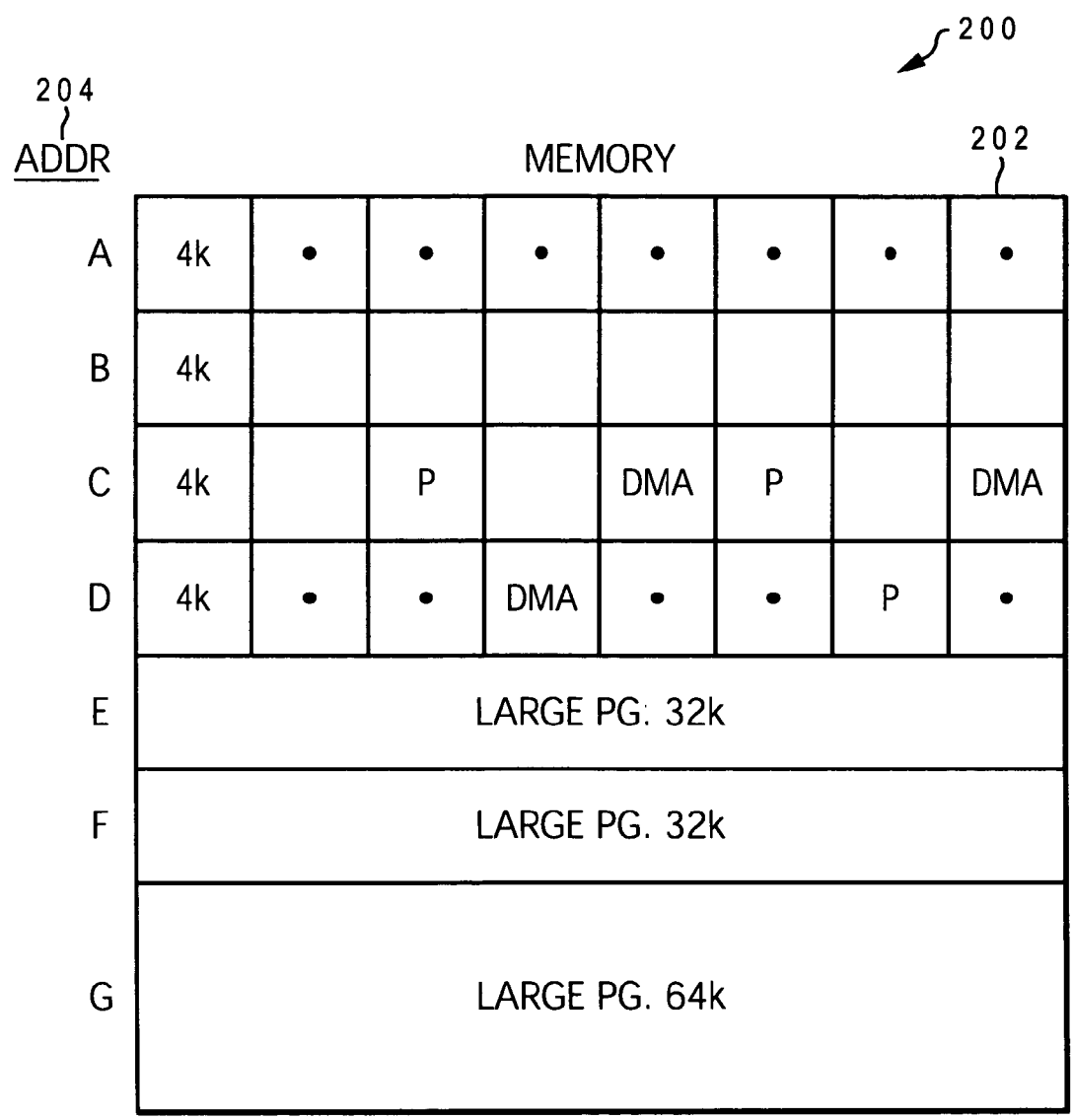
FIG. 2 is an exemplary layout of a memory configured with multiple size pages with some pinned and DMA-mapped pages, according to one embodiment of the invention.

FIG. 2 illustrates an exemplary virtual memory subdivided into different size pages, namely small 4k pages and large 64K pages. Each page has an associated address 204 that enables the page to be accessed by processes executing on the CPU. As shown, the first potion of virtual memory 200 is subdivided into multiple 4K sized pages, addressed A-D for simplicity. Within the 4K space, pages addressed C and D represent those small virtual pages that are the target of the page migration, while pages addressed A and B are virtual pages to which the used small pages (from C and D) are migrated. Those skilled in the art appreciate that actual addresses are assigned to each individual page and that the use of a single address space tag (A-D, etc.) is done to simplify the description of the invention, for which the actual address of each small virtual page has only a tangential relationship and does not directly affect the functional features provided by the invention.

In order to simplify the illustration and description thereof, used (U) pages within address space C and D are indicated with a "U" symbol. Also, several of these virtual pages are pinned to memory (indicated by a "P" within the page), while others are allocated/mapped for DMA (indicated by "DMA" within the page). In the illustrative embodiment, address spaces C and D, which include several small virtual pages that are either used or pinned or DMA-mapped, is cleared and later combined to provide a 64K space. As can be ascertained from the illustration, a 64K page comprises 16 contiguous smaller 4K pages. According to the invention, during page promotion, the operating system provides the tools required to move any used, pined and/or DMA-mapped small page within a contiguous set of small pages to another location (address space A and/or B) in memory in a most efficient manner.

Figure 3:
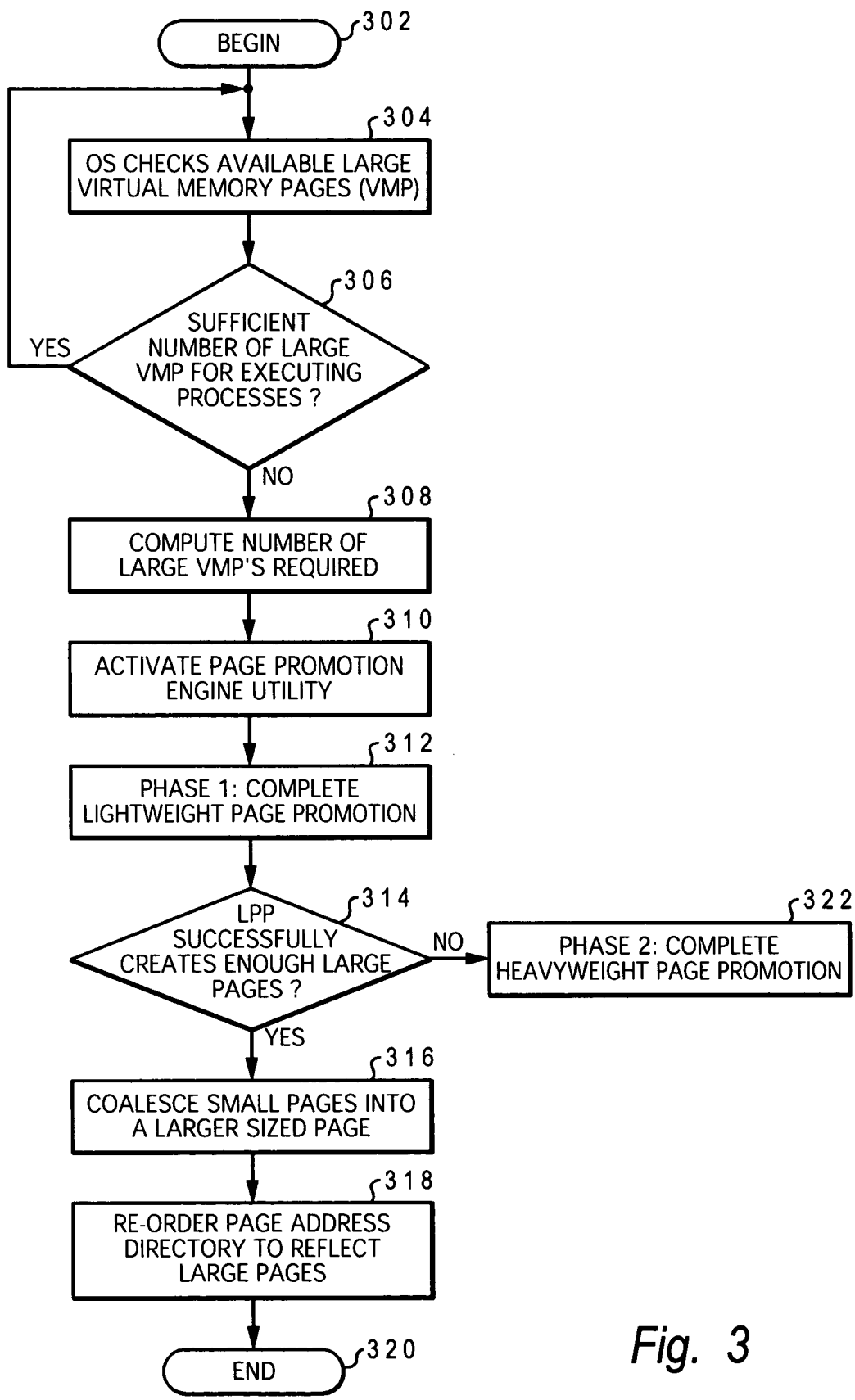
FIG. 3 is a flow chart of the process of determining when page promotion is required and completing the two-phase page promotion according to one embodiment of the invention.

FIG. 3 provides a flow chart of the process by which the 16 contiguous pages of address space C and D, for example, including those that are pined or DMA-mapped, are released/freed up and combined into a large page. The process begins at block 302, and following, at block 304, the operating system checks the amount of available large virtual memory pages. The operating system then determines at block 306 whether the amount of available large pages is sufficient to meet the needs of the current workload (of executing processes). If there are not enough large pages available, the operating system computes the target number of large pages required, as indicated at block 308.

Once the operating system determines the target number of additional large virtual memory pages required to meet the current workload, the operating system activates/initiates the page promotion utility as shown at block 310. The operating system has a target of large pages that needs to be created and the operating system attempts to free up enough contiguous small pages to provide the target of large pages. The page promotion utility (or the operating system), in turn triggers/activates the lightweight page promotion engine, which completes lightweight page promotion, as shown at block 312. In the lightweight page promotion phase, the operating system utilizes a conventional page migration engine to move unpinned, used small pages to different locations in real memory.

Figure 4A:
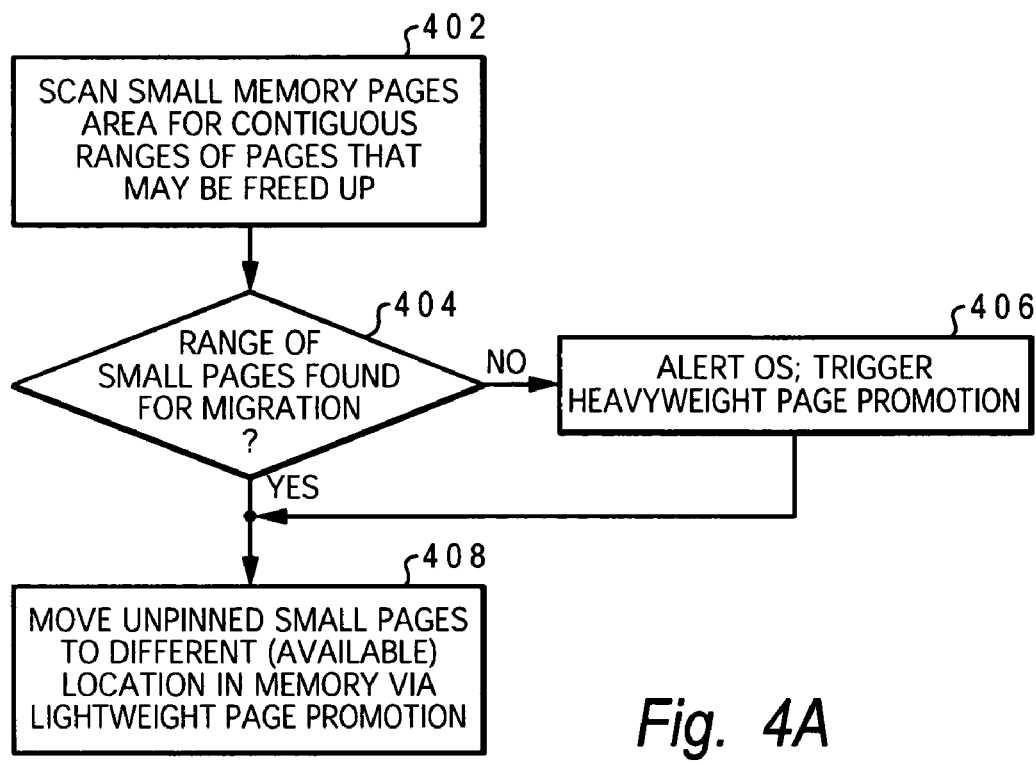
FIGS. 4A and 4B are flow charts of the processes of triggering heavyweight page promotion and completing heavy weight page promotion, respectively, according to embodiments of the invention.

FIG. 4A illustrates an exemplary process undertaken by the page promotion utility when modified to provide the two phase promotion/migration process. That is, unlike conventional lightweight page promotion limited to contiguous address spaces without any pined or DMA-mapped small pages, the page promotion utility activates the lightweight page promotion engine with a target contiguous address space that may include pined and/or DMA-mapped small pages. The page promotion utility is aware that page migration of these pinned and mapped small pages will be completed during the second/next phase of the process and is thus less selective when selecting a range of contiguous small pages for page promotion.

Turning now to the figure, as indicated by block 402, the lightweight page promotion engine scans over small memory pages and tries to find a group of contiguous ranges of pages that may be promoted using lightweight page promotion. The operating system may utilize one of several different scanning algorithms to find the contiguous ranges of small pages to try to migrate. One algorithm is to simply iterate over small pages in order of real memory address.

The page promotion utility determines at block 404 whether a contiguous range of small pages was located that could be coalesced into a large page with lightweight page promotion only. If no such range of small pages is found (i.e., there are pinned pages and/or DMA-mapped pages in ea possible range), then the utility is alerted at block 406 to trigger heavyweight page promotion engine once the lightweight page promotion engine completes its processing. When the operating system (page promotion utility) finds a contiguous range of small pages that may be promoted via lightweight page promotion, the lightweight page promotion engine migrates each in-use page using standard page migration, and heavyweight page promotion engine is not triggered.

Lightweight page promotion involves moving used pages within the contiguous range and comprises the following:

(1) Find a destination page P2 in real memory;

(2) Remove addressability to P1 so that no thread can modify its contents;

(3) Copy the contents of P1 to P2;

(4) Update translation entries that pointed to P1 to now point to P2; and (5) Make P2 addressable.

Following the lightweight page promotion phase, the operating system determines, at block 314, whether the lightweight page promotion was successful in providing enough contiguous small pages to create the target amount of large pages. When sufficient contiguous small spaces have been provided, the small pages are combined into the target number of large pages, as indicated at block 316. Following, the page address directory is re-ordered to reflect the addresses of the newly constituted large pages. However, when the operating system recognizes that it is unable to create the target number of large pages using the standard page migration engine, the operating system activates the second-phase page promotion engine, which completes heavyweight page promotion, as stated at block 322.

Figure 4B:
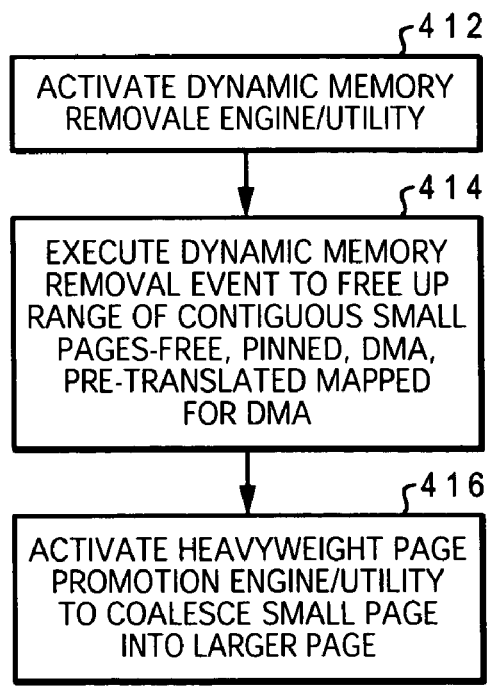

The process involved in the heavyweight page promotion phase is depicted in FIG. 4B. The heavyweight page promotion utility (or operating system) activates a dynamic memory removal engine (of the operating system) as shown at block 412. As indicated at block 414, the dynamic memory removal engine is utilized to free up (or removed from a locked state) any small pages that are pinned or DMA-mapped (i.e., pre-translated for DMA) within a range of contiguous small pages that are being tagged for page promotion.

Conventionally, the operating system's dynamic memory removal engine is used to remove real memory from a running operating system instance for use by another operating system instance (i.e. for use with dynamic logical partitioning). According to illustrative embodiments of the present invention, the functionality of the dynamic memory removal engine is adapted/enhanced to unlock the pinned and/or DMA-mapped pages and then migrate these pages via heavyweight page promotion as shown at block 416. With the above process, ranges of contiguous small pages that include pinned and/or DMA-mapped are "released" to be later combined into a large page.

Thus, for each range of contiguous small pages needed to be freed, the heavyweight page promotion engine first executes a dynamic memory removal event, which causes the dynamic memory removal engine to free each range of contiguous small pages using the entire dynamic memory removal infrastructure. In operating systems such as AIX, for example, the dynamic memory removal engine handles migrating pinned and DMA-mapped pages by communicating with the operating system's DMA subsystem. In one embodiment, the dynamic memory removal engine can also handle migrating pages that are pre-translated for DMA. Once a dynamic memory remove operation has completed for a contiguous range of small pages, all of the small pages in the range will no longer be in-use, and the heavy-weight page promotion engine can combine the contiguous small pages into a larger sized page.

As previous described, heavyweight page promotion effectively consists of executing dynamic memory remove events to free up ranges of small pages. In the heavyweight page promotion phase, an operating system will scan over small memory pages and free contiguous ranges of pages by issuing dynamic memory remove events for each range. Each dynamic memory remove event will utilize its standard algorithm for removing a range of real memory. In one embodiment, dynamic memory remove may utilize a combination of page replacement and page migration to free up a range of real memory.

Once a dynamic memory remove event has completed, the heavyweight page promotion engine will have available a free (unutilized) contiguous range of small pages that can be utilized as a large page. The operating system will continue to use dynamic memory remove events to free contiguous ranges of small pages in the heavyweight page promotion phase until the operating system creates its target number of large pages.

Several benefits are provided by the invention, including: (1) by utilizing an operating system's dynamic memory removal subsystem, the heavyweight page promotion engine is able to handle coalescing ranges of small pages that contain pinned and DMA-mapped pages. Thus, an operating system is able to create large pages from small pages even in environments where many small pages are pinned or mapped for DMA; and (2) by utilizing a two-phase approach to page promotion, the invention maximizes the performance and efficiency of coalescing small pages into large pages. Since using heavyweight page promotion involves much more overhead than just standard page migration, the two-stage process implemented by invention maintains optimal efficiency by only reverting to heavy-weight page promotion when the faster lightweight page migration is no longer effective.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
   determining when a large virtual page of memory is required;
   identifying a target memory location comprising a plurality of small virtual pages for coalescing as the large virtual page, wherein said identifying does not reject selection of a target memory location that includes one or more of DMA-mapped pages and pinned pages and pages that are pre-translated for DMA;
   performing a first phase page promotion to move one or more smaller pages that are of a first type from within a target memory location to another memory location, wherein the first type is a small virtual page that is being utilized and is not a pinned page or a DMA-mapped page, and wherein the target memory location has a range of contiguous address space that is sufficient for the large virtual page;
   when the first phase page promotion fails to provide sufficient contiguous, small, free virtual pages to combine into the large virtual page and there exist at least one page of a second type, regardless of the number of first type pages that were promoted from within the target memory location, dynamically and automatically implementing a second phase page promotion to move one or more small pages that are of the second type from within the target memory location to another memory location, such that sufficient contiguous small, unused virtual pages are available for combining into the large virtual page, wherein the second type is a small virtual page that is one of a pinned page or a DMA-mapped page or a page that is pre-translated for DMA;
   re-ordering an associated page address directory to account for the new memory location of each small virtual page moved to another memory location; and
   providing an address within the page address directory for the large virtual page created.

2. The method of claim 1, wherein said determining further comprises:
   finding a range of contiguous address space with a minimal number of small pages of the second type and which has a required size for the large virtual page; and
   locating free address space outside the contiguous address space for use as the other memory location to which used small pages within the range of contiguous address space are moved, wherein said first phase and said second phase page promotion are implemented only when there is sufficient contiguous address space for the large virtual page and space for moving the small pages that are not free out of the contiguous address space.

3. The method of claim 1, wherein when the range of contiguous address space does not include any small pages of the second type, implementing only the first phase page promotion.

4. The method of claim 1, wherein said dynamically implementing comprises:
   activating an enhanced dynamic memory removal engine of an operating system to free up pinned pages and DMA-mapped or pre-translated pages; and
   initiating the second phase page promotion to combine small virtual pages within a contiguous area of unused small pages into the large virtual page.

5. The method of claim 1, wherein said determining includes:
   evaluating a need for large virtual pages by operations executing on the data processing system; and
   triggering the creation of one or more large virtual pages based on the need evaluated.

* * * * *